(12) United States Patent
Sinha (10) Patent No.: US 9,097,819 B2
(45) Date of Patent: Aug. 4, 2015

(54) THERMOELASTIC LOGGING

(71) Applicant: SCHLUMBERGER TECHNOLOGY CORPORATION, Sugar Land, TX (US)

(72) Inventor: Bikash Sinha, Cambridge, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 396 days.

(21) Appl. No.: 13/714,067

(22) Filed: Dec. 13, 2012

(65) Prior Publication Data
US 2014/0169131 A1    Jun. 19, 2014

(51) Int. Cl.
| | |
|---|---|
| *G01V 1/40* | (2006.01) |
| *G01V 1/44* | (2006.01) |
| G01V 1/50 | (2006.01) |
| E21B 47/06 | (2012.01) |
| G01V 9/00 | (2006.01) |

(52) U.S. Cl.
CPC .. *G01V 1/44* (2013.01); *G01V 1/40* (2013.01); *E21B 47/065* (2013.01); *G01V 1/50* (2013.01); *G01V 9/00* (2013.01)

(58) Field of Classification Search
CPC .............. G01V 1/40; G01V 1/44; G01V 1/50; E21B 47/06; E21B 47/00; E21B 47/065
USPC ................ 367/25, 31, 35; 73/152.02, 152.12, 73/152.16
See application file for complete search history.

(56) References Cited

U.S. PATENT DOCUMENTS

| | | |
|---|---|---|
| 6,611,761 B2 | 8/2003 | Sinha et al. |
| 7,529,152 B2 | 5/2009 | Sinha et al. |
| 8,077,546 B2 | 12/2011 | Hansteen et al. |
| 2006/0012367 A1 | 1/2006 | Meaney et al. |
| 2009/0091320 A1 | 4/2009 | Flaum et al. |
| 2011/0154895 A1* | 6/2011 | Charara et al. ............. 73/152.16 |

OTHER PUBLICATIONS

International Search Report and Written Opinion of PCT Application No. PCT/US2013/064448 dated Jan. 16, 2014: pp. 1-9.

* cited by examiner

*Primary Examiner* — Ian J Lobo
(74) *Attorney, Agent, or Firm* — Jakub Michna (57) ABSTRACT

A method for thermoelastic logging in a borehole of a subterranean formation. The method includes generating, by a computer processor, a reference dispersion based on a borehole wave dispersion measurement of the borehole, wherein the reference dispersion represents far-field elastic properties in the subterranean formation, analyzing, by the computer processor, a difference between the reference dispersion and the borehole wave dispersion measurement based on a thermoelastic model of the subterranean formation to generate an analysis result, and determining, by the computer processor and based on the analysis result, a temperature dependent parameter of the subterranean formation.

20 Claims, 7 Drawing Sheets

THERMOELASTIC LOGGING

BACKGROUND

Operations, such as geophysical surveying, drilling, logging, well completion, hydraulic fracturing, steam injection, and production, are typically performed to locate and gather valuable downhole fluids. Surveys are often performed using acquisition methodologies to acquire information of underground formations. These formations are often analyzed to determine the presence of subterranean assets, such as valuable fluids or minerals, or to determine if the formations have characteristics suitable for storing fluids. The subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion and/or production using the wellbore.

SUMMARY

In general, in one aspect, embodiments of the invention relate to a method for thermoelastic logging in a borehole of a subterranean formation. The method includes generating, by a computer processor, a reference dispersion based on a borehole wave dispersion measurement of the borehole, wherein the reference dispersion represents far-field elastic properties in the subterranean formation, analyzing, by the computer processor, a difference between the reference dispersion and the borehole wave dispersion measurement based on a thermoelastic model of the subterranean formation to generate an analysis result, and determining, by the computer processor and based on the analysis result, a temperature dependent parameter of the subterranean formation.

In general, in one aspect, embodiments of the invention relate to a system for thermoelastic logging in a borehole of a subterranean formation. The system includes a sonic tool in the borehole to obtain a borehole wave dispersion measurement of the borehole, a processor and memory storing instructions, when executed by the processor comprising functionalities to generate a reference dispersion based on the borehole wave dispersion measurement, wherein the reference dispersion represents far-field elastic properties in the subterranean formation, analyze a difference between the reference dispersion and the borehole wave dispersion measurement based on a thermoelastic model of the subterranean formation to generate an analysis result, and determine, based on the analysis result, a temperature dependent parameter of the subterranean formation, and a repository storing the borehole wave dispersion measurement.

In general, in one aspect, embodiments of the invention relate to a non-transitory computer readable medium storing instructions for thermoelastic logging in a borehole of a subterranean formation. The instructions when executed causing a computer processor to generate a reference dispersion based on a borehole wave dispersion measurement of the borehole, wherein the reference dispersion represents far-field elastic properties in the subterranean formation, analyze a difference between the reference dispersion and the borehole wave dispersion measurement based on a thermoelastic model of the subterranean formation to generate an analysis result, and determine, based on the analysis result, a temperature dependent parameter of the subterranean formation.

BRIEF DESCRIPTION OF DRAWINGS

The appended drawings illustrate several embodiments of thermoelastic logging and are not to be considered limiting of its scope, for thermoelastic logging may admit to other equally effective embodiments.

FIG. 1.1 is a schematic view of a wellsite depicting a data logging operation in which one or more embodiments of thermoelastic logging may be implemented.

FIG. 1.2 is a schematic diagram of a system used in thermoelastic logging in accordance with one or more embodiments.

FIGS. 3.1-3.4 show an example of thermoelastic logging in accordance with one or more embodiments.

DETAILED DESCRIPTION

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Aspects of the present disclosure include a method, system, and computer readable medium to perform thermoelastic logging. Specifically, thermoelastic logging explores characteristic responses of borehole waves recorded by a sonic tool to investigate radial variations in the temperature of the formation. In one or more embodiments, the borehole fluid (e.g., drilling mud or other fluid replacing the drilling mud subsequent to drilling completion) as introduced into the borehole is cooler than the formation and causes radially varying temperature distributions. The temperature distributions may be further affected by formation fractures that have been invaded by the borehole fluid. In one or more embodiments, formation temperature may be further affected by steam injection from an adjacent injection well. Generally, the borehole fluid temperature and subterranean formation temperature are significantly different while drilling or completing a well or during Enhanced Oil Recovery (EOR) projects when cold mud is circulated in cased-holes. Such radially temperature gradients in the formation moving away from the borehole surface introduces radially varying thermal stresses that affect propagation characteristics of elastic waves along the borehole axis. Depending on the thermal conductivity and thermal diffusivity of the surrounding formation, the time to temperature equilibration (i.e., when steady state temperature in the far-field is attained at the borehole surface) varies. In particular, the far-field refers to the formation at radial distances larger than a threshold (usually, about two times of borehole diameters away from the borehole surface). Generally, the elastic properties, stresses and temperature of the formation in the far-field are radially uniform for a given azimuth. During the time period prior to temperature equilibration, the effects of the tensile stresses in the near-wellbore annulus induced by the temperature variations may be captured using the thermoelastic logging techniques disclosed herein.

In one or more embodiments, the thermoelastic constant and radial extent of temperature variation outside the borehole surface are determined by inversion of differences between a borehole wave dispersion measurement (e.g., the measured Stoneley or dipole flexural dispersion) and a reference dispersion (e.g., reference Stoneley or dipole flexural dispersion). In particular, the reference dispersion is characteristic of an EIH (i.e., equivalent-isotropic and radially homogeneous) formation defined by the far-field formation properties. Variations in such thermoelastic properties of the formation at different depths are used to identify open fractures saturated with oil/water or gas. For example, a characteristic hump in the dipole flexural dispersion detected at a particular depth is an indicator of presence of such radial temperature gradients away from the borehole surface. This indicator is used to identify open fractures saturated with oil/water or gas, for example natural fractures or fractures caused by hydraulic fracturing treatments in Enhanced Oil Recovery (EOR) projects.

Figure 11:
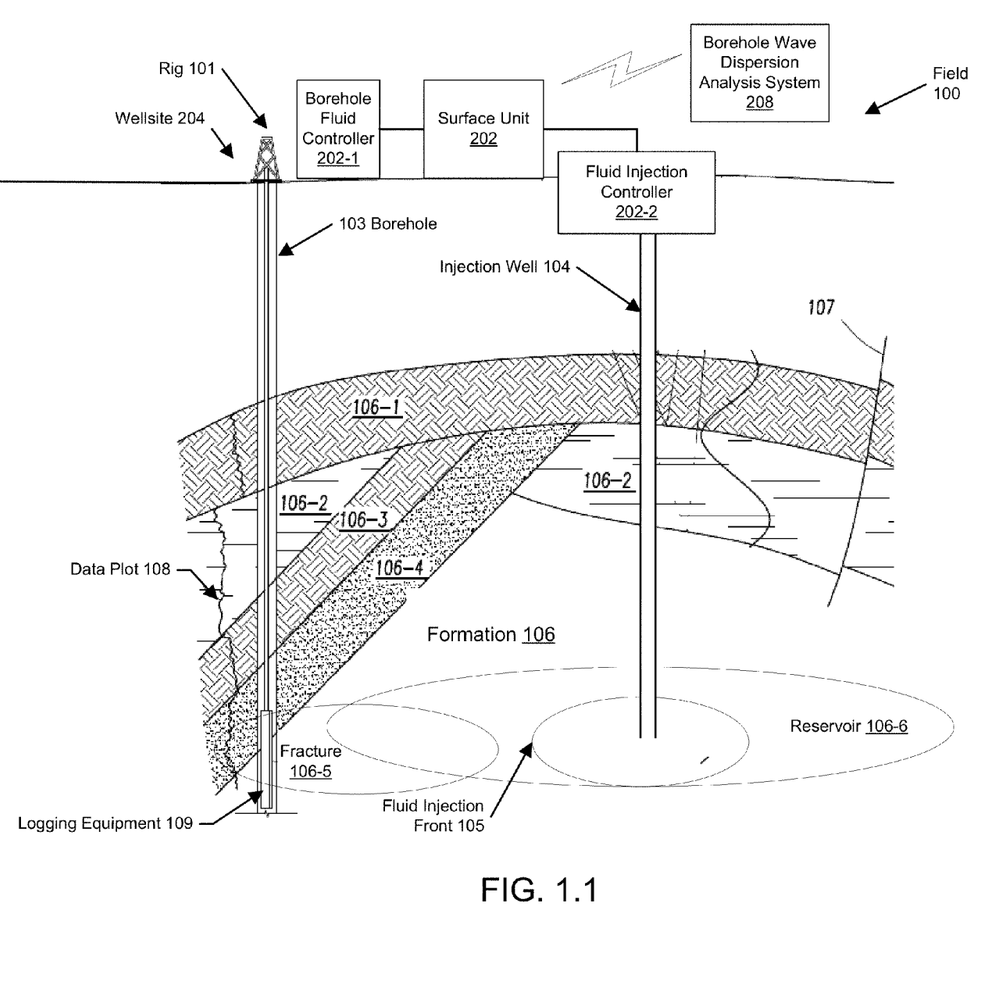

FIG. 1.1 depicts a schematic view, partially in cross section, of a field (100) in which one or more embodiments of thermoelastic logging may be implemented. In one or more embodiments, one or more of the modules and elements shown in FIG. 1.1 may be omitted, repeated and/or substituted. Accordingly, embodiments of thermoelastic logging should not be considered limited to the specific arrangements of modules shown in FIG. 1.1.

As shown in FIG. 1.1, the subterranean formation (106) includes several geological structures. As shown, the formation has a sandstone layer (106-1), a limestone layer (106-2), a shale layer (106-3), a sand layer (106-4), a fracture (106-5), and a reservoir (106-6). A fault line (107) extends through the formation intersecting these geological structures. Further, the fracture (106-5) may be a natural fracture or a hydraulically induced fracture. In one or more embodiments, various survey tools and/or data acquisition tools are adapted to measure the formation and detect the characteristics of the geological structures of the formation.

As shown in FIG. 1.1, the wellsite (204) includes a rig (101), a borehole (103), a borehole fluid controller (202-1), and other wellsite equipment and is configured to perform wellbore operations, such as logging, drilling, fracturing, production, or other applicable operations. For example, the borehole fluid controller (202-1) may be a drilling mud pump re-circulating drilling mud during a drilling operation, a hydraulic fracturing injector injecting hydraulic fluid during a fracturing or EOR operation, or other type of borehole fluid (e.g., water used during a wireline logging operation) temperature controller. In one or more embodiments, the borehole fluid controller (202-1) is configured to control temperature, flow rate, or other pertinent parameters of the borehole fluid. Further, the injection well (104) is associated with a fluid injection controller (202-2). In one or more embodiments, the fluid injection controller (202-2) is used to perform an injection operation, such as injecting steam into the reservoir (106-6) to enhance heavy oil production at the wellsite (204). For example, the injection operation may establish a fluid injection front (105) starting from an opening of the injection well (104) and propagating toward the borehole (103) as the production well. Generally, these operations performed at the wellsite (204) and/or the injection well (104) are referred to as field operations of the field (100). These field operations are typically performed as directed by the surface unit (202).

In one or more embodiments, the surface unit (202) is operatively coupled to the wellsite (204) and the fluid injection controller (202-2) at the injection well (104). In one or more embodiments, surface unit (202) may be located at the wellsite (204), injection well (104), and/or remote locations. The surface unit (202) may be provided with computer facilities for receiving, storing, processing, and/or analyzing data from data acquisition tools (e.g., logging equipment (109)) disposed in the borehole (103), or other part of the field (100). In one or more embodiments, the logging equipment (109)) is installed on a bottom hole assembly (BHA) in the borehole (103) (or on a wireline). The surface unit (202) may also be provided with functionally for actuating mechanisms (e.g., associated with borehole fluid controller (202-1), fluid injection controller (202-2), etc.) at the field (100). The surface unit (202) may then send command signals to these actuating mechanisms of the field (100) in response to data received, for example to control and/or optimize various field operations described above.

As noted above, the surface unit (202) is configured to communicate with data acquisition tools (e.g., logging equipment (109)) disposed throughout the field (100) and to receive data therefrom. In one or more embodiments, the data received by the surface unit (202) represents characteristics of the subterranean formation (106) and may include information related to porosity, saturation, permeability, stress magnitude and orientations, elastic properties, thermal properties, etc. In particular, the thermal properties may include thermal conductivity, thermal diffusivity, volumetric heat capacity, thermal expansion coefficient, etc., that are dependent on the type of rock material in various layers (106-1) through (106-4) of the formation (106). In one or more embodiments, the data may be received by the surface unit (202) during a drilling, fracturing, logging, injection, or production operation of the borehole (103) and/or the injection well (104). For example, data plot (108) may be a wireline log obtained during a wireline logging operation, logging-while-drilling (LWD) operation, or other types of logging operations. Generally, the data plot (108) is a measurement of a formation property as a function of depth taken by an electrically powered instrument to infer properties and make decisions about drilling and production operations.

In one or more embodiments, the surface unit (202) is communicatively coupled to a borehole wave dispersion analysis system (208). In one or more embodiments, the data received by the surface unit (202) may be sent to the borehole wave dispersion analysis system (208) for further analysis. In one or more embodiments, borehole wave dispersion analysis system (208) is configured to determine a temperature dependent parameter (e.g., a thermoelastic constant) of the subterranean formation (106) by analyzing a borehole wave dispersion measurement provided from the surface unit (202).

Typically, the field operations (e.g., logging, drilling, fracturing, injection, production or other applicable operations) are performed according to a field operation plan that is established prior to the field operations. The field operation plan typically sets forth equipment, pressures, trajectories and/or other parameters that define the operations performed for the wellsite. The field operation may then be performed according to the field operation plan. However, as information is gathered, the field operation may deviate from the field operation plan. Additionally, as drilling, fracturing, injection, EOR, or other operations are performed, the subsurface conditions may change. An earth model may also be adjusted as new information is collected. Such information may include results generated by the borehole wave dispersion analysis system (208) that is used to identify appropriate changes to the field operation plan to address a new found event. For example, the fracturing, injection, EOR or other production plan may be adjusted based on a fluid containing fracture (106-5) or a fluid injection front (105) detected by the borehole wave dispersion analysis system (208).

Figure 12:
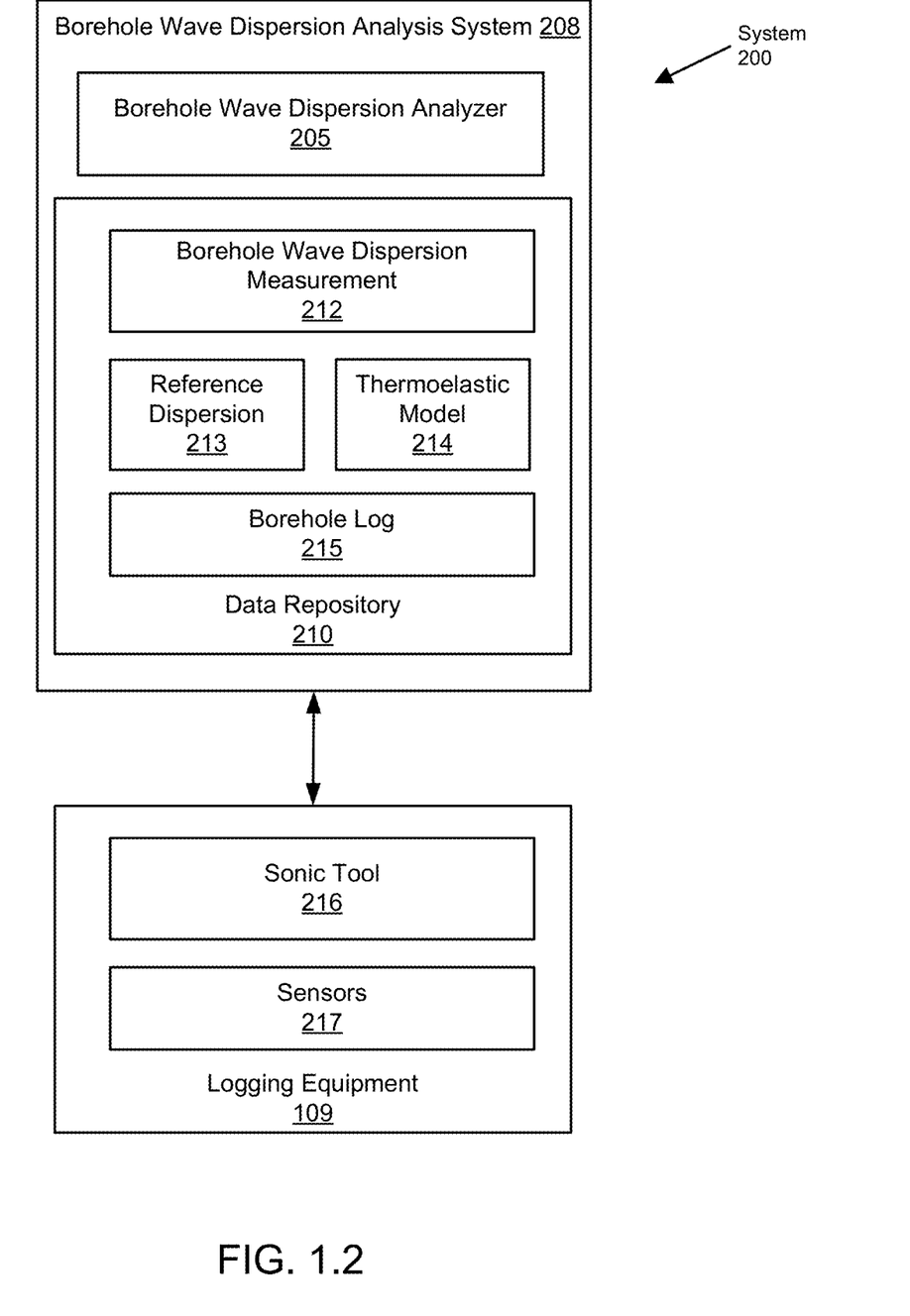

FIG. 1.2 is a schematic diagram of a system (200) used in thermoelastic logging in accordance with one or more embodiments. In one or more embodiments, one or more of the modules and elements shown in FIG. 1.2 may be omitted, repeated, and/or substituted. Accordingly, embodiments of thermoelastic logging should not be considered limited to the specific arrangements of modules shown in FIG. 1.2. As shown in FIG. 1.2, the system (200) includes details of the logging equipment (109) and the borehole wave dispersion analysis system (208) shown in FIG. 1.1. Specifically, the logging equipment (109) includes a sonic tool (216) and sensors (217). The borehole wave dispersion analysis system (208) includes a borehole wave dispersion analyzer (205) and data repository (210). In one or more embodiments, the data repository stores information used by the borehole wave dispersion analyzer (205), such as a borehole wave dispersion measurement (212), reference dispersion (213), thermoelastic model (214), and borehole log (215). The surface unit (202) is omitted from the system (200) for clarity.

In one or more embodiments, the logging equipment (109) includes the sonic tool (216) that is configured to obtain a borehole wave dispersion measurement of the borehole (103) shown in FIG. 1.1. Generally, a fluid-filled borehole may be modeled as an acoustic waveguide having various acoustic wave modes. For example, a Stoneley wave is a high-amplitude interface wave that typically propagates along a solid-fluid interface. The Stoneley wave makes up a large part of the low-frequency component of the signal from the sonic source and its attenuation is sensitive to fractures and formation permeability. In one or more embodiments, the borehole wave dispersion measurement includes measurements of borehole guided acoustic wave propagation parameters as a function of frequency or wave-number.

In one or more embodiments, Stoneley waves are generated by the sonic tool (216) along the walls (i.e., borehole surface) of the fluid-filled borehole (e.g., borehole (103) shown in FIG. 1.1) and measured by the sonic tool (216) to obtain dispersion measurement data (e.g., part of data plot (108) shown in FIG. 1.1). In one or more embodiments, the Stoneley waves are generated by one or more monopole sources and measured by an array of sonic receivers in the sonic tool (216). Accordingly, the dispersion measurement data includes Stoneley dispersion obtained from an array of recorded monopole waveforms (i.e., multiple waveforms forming an array). In one or more embodiments, the dispersion measurement data is provided to the borehole wave dispersion analysis system (208) and stored in the data repository (210) as the borehole wave dispersion measurement (212). In one or more embodiments, in addition to the Stoneley wave, other acoustic wave modes (e.g., dipole flexural mode) may also be used (e.g., based on one or more dipole sources) to obtain the borehole wave dispersion measurement (212). As will be described later, the borehole wave dispersion measurement (212) is analyzed by the borehole wave dispersion analysis system (208) to estimate rock properties along the borehole (103).

In one or more embodiments, the logging equipment (109) further includes sensors (217) disposed in the borehole (103). For example, the sensors (217) may include a temperature sensor, pressure sensor, or other type of sensor. In one or more embodiments, the sensors (217) are disposed adjacent to the sonic tool (216) in the borehole (103) to measure temperature, pressure, or other type of parameter in proximity of the sonic tool (216). For example, the sensors (217) may include a temperature sensor configured to measure a borehole fluid temperature of borehole fluid near the sonic tool (216). Specifically, the borehole fluid is introduced into the borehole (103) at an initial temperature that is different (e.g., lower or higher) than the formation temperature surrounding or away from the borehole (103). For example, the formation temperature surrounding the borehole (103) may initially be the steady state temperature (referred to as the far-field formation temperature) of the formation (106) shown in FIG. 1.1. In one or more embodiments, the far-field formation temperature is determined based on naturally occurring geothermal gradients found in the formation (106). For example, geothermal gradient may be caused by the rate of increasing temperature with respect to increasing depth in the Earth's interior. In one or more embodiments, the far-field formation temperature is determined based on steam injection temperature at the fluid injection front (105).

Non-uniform heating and cooling of formation rocks can be caused by differences in the borehole fluid and formation temperatures. With a steady-state temperature in the far-field, any temperature variation injected from the borehole surface into the formation (106) introduces incremental changes in the thermal stresses and strains in the near-wellbore annulus. In particular, these changes propagate from the borehole (103) into the formation (106) where it has been in a radially uniform reference state. Changes in such thermal stresses and strains can be detected by elastic waves (e.g., Stoneley waves, dipole flexural mode or higher-order quadrupole waves, etc.) propagating along the fluid-filled borehole (103). In one or more embodiments, by varying the depth of the logging equipment (109) in the borehole (103) and analyzing the borehole wave dispersion measurement (212) obtained therefrom, the borehole wave dispersion analysis system (208) is configured to generate a borehole log (215) that includes a temperature dependent parameter as a function of a depth in the borehole (103). Accordingly, a feature (e.g., a fluid containing fracture) of the subterranean formation may be detected based on the borehole log (215).

In one or more embodiments, the borehole wave dispersion analysis system (208) corresponds to hardware, software, or a combination thereof. In one or more embodiments, the borehole wave dispersion analysis system (208) is configured to generate the reference dispersion (213) based on the borehole wave dispersion measurement (212). Specifically, the reference dispersion (213) represents far-field elastic properties in the subterranean formation. The fracture propagation and steam injection directions can introduce azimuthal dependence in the formation elastic properties, stresses and temperature. Therefore, recorded waveforms at azimuthal receivers are examined to identify any azimuthal dependence. In the presence of a significant azimuthal dependence, processing and analyses of sonic waveforms are carried out at a select azimuth and the far-field refers to this particular azimuth. In one or more embodiments, the reference dispersion (213) is characteristic of an EIH (i.e., equivalent-isotropic and radially homogeneous) formation defined by the far-field formation properties. Additional details of the reference dispersion (213) are described in reference to FIGS. 3.1-3.4 below.

In one or more embodiments, the borehole wave dispersion analysis system (208) is further configured to analyze a difference between the reference dispersion (213) and the borehole wave dispersion measurement (212) based on the thermoelastic model (214) of the subterranean formation (106) to generate an analysis result. In one or more embodiments, borehole fluids are introduced into the borehole (103) at a borehole fluid temperature that is different from a formation temperature of the subterranean formation (106). As noted above, the temperature difference causes radially varying amounts of thermal stresses that affect propagation characteristics of elastic waves along an axis of the borehole (103). In one or more embodiments, the thermoelastic model (214) describes relationships between the borehole fluid temperature, the formation temperature, the thermal stresses, the propagation characteristics of the elastic waves, thermoelastic constant and/or other temperature dependent parameter(s) of the subterranean formation (106). For example, the thermoelastic model (214) may include mathematical formulae and/or be described using suitable modeling data format or modeling language. Additional details of the borehole wave dispersion measurement (212) and the thermoelastic model (214) are described in reference to FIGS. 3.1-3.4 below.

In one or more embodiments, based on the analysis result, the borehole wave dispersion analysis system (208) is further configured to determine a temperature dependent parameter of the subterranean formation (106). For example, the temperature dependent parameter may be a thermoelastic constant of the subterranean formation (106) at different borehole depths and/or as a function of a radial distance away from the borehole (103). In one or more embodiments, based on the thermoelastic constant, a temperature of the subterranean formation (106) may be determined, for example as a function of the radial distance from the borehole (103). In one or more embodiments, the temperature of the subterranean formation (106) is determined based on an empirical relationship between the thermoelastic constant and the formation temperature. Additional details of the borehole log (215) and the thermoelastic constant contained therein are described in reference to FIGS. 3.1-3.4 below.

In one or more embodiments, the borehole log (215) may be displayed to a user. For example, the borehole log (215) may be displayed using a display device in the surface unit (202) or in a remote data center coupled to the surface unit (202) and/or the borehole wave dispersion analysis system (208). In one or more embodiments, the borehole log (215) is displayed to a user performing a field operation using equipments associated with the surface unit (202). Accordingly, the field operation is performed based at least on the borehole log (215) (e.g., based on the temperature dependent parameter contained therein) of the subterranean formation (106). For example, the user may adjust a control parameter of the EOR operation of the borehole (103) based on a thermoelastic constant associated with a fluid containing fracture that is identified by the user viewing the borehole log (215). In one or more embodiments, the EOR control parameter (e.g., hydraulic pressure, flow rate, etc., of the borehole fluid) is adjusted via the borehole fluid controller (202-1), which includes a hydraulic injector. In another example, the user may adjust a steam injection parameter of the injection operation of the injection well (104) based on a thermoelastic constant associated with the fluid injection front (105) that is identified by the user viewing the borehole log (215). In one or more embodiments, the steam injection parameter (e.g., injection pressure, flow rate, etc., of the injected steam) is adjusted via the fluid injection controller (202-2), which includes a steam injector.

In one or more embodiments, the data repository (210) is any type of storage unit and/or device (e.g., a file system, database, collection of tables or any other storage mechanism) for storing data. Further, the data repository (210) may include multiple different storage units and/or devices. The multiple different storage units and/or devices may or may not be of the same type or located at the same physical site. For example, a portion of the data repository (210) may be located on the BHA (or wireline) with the logging equipment (109) while another portion may be located at the surface unit (202).

Figure 2:
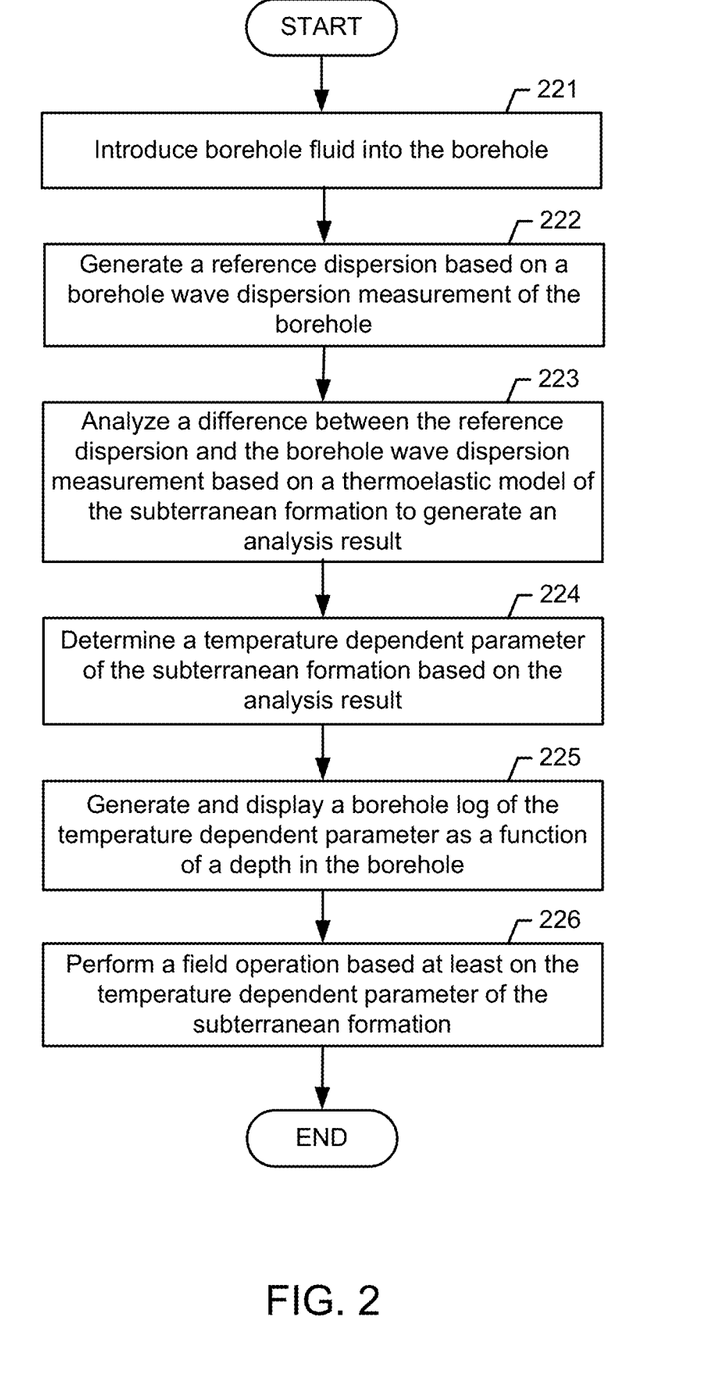
FIG. 2 shows an example flowchart of thermoelastic logging in accordance with one or more embodiments.

FIG. 2 depicts an example flowchart of thermoelastic logging in accordance with one or more embodiments. For example, the method depicted in FIG. 2 may be practiced using the borehole wave dispersion analysis system (208) described in reference to FIGS. 1.1 and 1.2 above. In one or more embodiments, one or more of the elements shown in FIG. 2 may be omitted, repeated and/or performed in a different order. Accordingly, embodiments of thermoelastic logging should not be considered limited to the specific arrangements of elements shown in FIG. 2.

In one or more embodiments, the method depicted in FIG. 2 is practiced to perform thermoelastic logging to identify logged depth intervals with different thermoelastic constants. For example, fractured formations filled with gas or liquid exhibit different thermal properties than unfractured formations.

Initially in Element 221, borehole fluid is introduced into the borehole from a wellsite. For example, the borehole fluid may be drilling mud re-circulating through the borehole during a drilling operation. In this example, the thermoelastic logging may be performed as a logging-while-drilling (LWD) operation. In another example, the drilling mud may be replaced by other fluid (e.g., water) during a wireline logging operation in open- or cased-holes. In this example, the borehole fluid may be stationary without re-circulation. In one or more embodiments, the borehole fluid and the subterranean formation have different temperatures. For example, the borehole fluid temperature may be cooler than the formation temperature during a typical drilling operation. In another example, the borehole fluid temperature may be higher than the formation temperature during an EOR operation. In yet another example, the borehole fluid temperature may be cooler than the formation temperature due to an adjacent steam injection well. Whether higher or cooler, these temperature differences cause radially varying amounts of thermal stresses that affect propagation characteristics of elastic waves along an axis of the borehole.

In Element 222, a reference dispersion is generated based on a borehole wave dispersion measurement of the borehole. In one or more embodiments, the borehole wave dispersion measurement includes measurements of borehole guided acoustic wave propagation parameters as a function of frequency or wave-number. In one or more embodiments, the borehole wave dispersion measurement is obtained using the borehole wave dispersion measurement analysis system described in reference to FIG. 1.2 above. For example, the borehole wave dispersion measurement may include Stoneley dispersion or dipole flexural dispersion obtained from an array of recorded monopole waveforms. In one or more embodiments, the Stoneley dispersion and/or dipole flexural dispersion is inverted in a low frequency range (e.g., 1-3 kHz, 0-10 kHz, etc.) to compute one or more far-field shear moduli (e.g., $C_{66}$ from the Stoneley dispersion $C_{44}$ and $C_{55}$ from the dipole flexural dispersion). The reference dispersion is then computed for the borehole configuration (e.g., borehole dimension, radius, an open or cased hole, etc.) using the computed far-field shear moduli based on an EIH formation (i.e., equivalent-isotropic and radially homogeneous) model. Depending on the particular formation layer intersected by the borehole, the EIH formation model can vary. In one or more embodiments, the reference dispersion includes computed borehole guided acoustic wave propagation parameters (as a function of frequency or wave-number) in a steady state formation (e.g., far-field portion of the formation) without the thermal stress/strain introduced by the aforementioned temperature difference. Accordingly, the reference dispersion represents far-field elastic properties in the subterranean formation. Additional details of the reference dispersion and the borehole wave dispersion measurement are described in reference to FIGS. 3.1-3.4 below.

In Element 223, a difference between the reference dispersion and the borehole wave dispersion measurement is analyzed based on a thermoelastic model of the subterranean formation to generate an analysis result. As noted above, radially variances in the temperature of the formation away from the borehole surface introduces radially varying thermal stresses that affect propagation characteristics of elastic waves along the borehole axis. In particular, the affected propagation characteristics of elastic waves are reflected in the difference between the reference dispersion and the borehole wave dispersion measurement. In one or more embodiments, the thermoelastic model models the thermal stresses, the propagation characteristics of the elastic waves, and thermoelastic parameter(s) of the subterranean formation. For example, the thermoelastic model may include mathematical formulae for calculating characteristics of the elastic wave propagation based on modeled thermal stresses and thermoelastic parameter(s) of the formation. Accordingly, the thermoelastic model is used to determine the thermoelastic parameter(s) (or other temperature dependent parameter) by interpreting the difference between the reference dispersion and the borehole wave dispersion measurement. Additional details of the thermoelastic model and analyzing the difference between the reference dispersion and the borehole wave dispersion measurement are described in reference to FIGS. 3.1-3.4 below.

In Element 224, a temperature dependent parameter of the subterranean formation is determined based on the analysis result. In one or more embodiments, the temperature dependent parameter is a thermoelastic parameter of the subterranean formation. Further, the temperature of the subterranean formation may be determined as a function of a radial distance from the borehole determining based on an empirical dependence relationship with respect to the temperature dependent parameter. The temperature of the subterranean formation as a function of radial distance from the borehole axis can be used to estimate radial distance of the steam front in an EOR operation where steam and carbon dioxide are injected from an injection well into a reservoir to increase mobility of heavy oil for improved hydrocarbon productivity. Additional details of determining the temperature dependent parameter are described in reference to FIGS. 3.1-3.4 below.

In Element 225, a borehole log of the temperature dependent parameter is generated by varying a depth of a bottom hole assembly (BHA) (or wireline) in the borehole. Specifically, the borehole wave dispersion measurement is obtained from the borehole wave dispersion measurement analysis system located on the BHA (or wireline). Further, the borehole log of the temperature dependent parameter of the subterranean formation may be displayed to a user. For example, the user may be using equipment at the wellsite to perform a field operation.

In Element 226, the field operation may be performed or adjusted based at least on the borehole log of the temperature dependent parameter of the subterranean formation. In one or more embodiments, a feature of the subterranean formation is detected based on the borehole log. For example, the feature of the subterranean formation may include a fracture containing the borehole fluid entered from the borehole, and therefore exhibits different thermoelastic properties with respect to other depth intervals in the formation. Additional details of detecting the feature and adjusting the field operation are described in reference to FIGS. 3.1-3.4 below.

FIGS. 3.1-3.4 show an example of thermoelastic logging in accordance with one or more embodiments. In one or more embodiments, one or more of the modules and elements shown in FIGS. 3.1-3.4 may be omitted, repeated and/or substituted. Accordingly, embodiments of thermoelastic logging should not be considered limited to the specific arrangements of modules shown in FIGS. 3.1-3.4.

Figure 31:
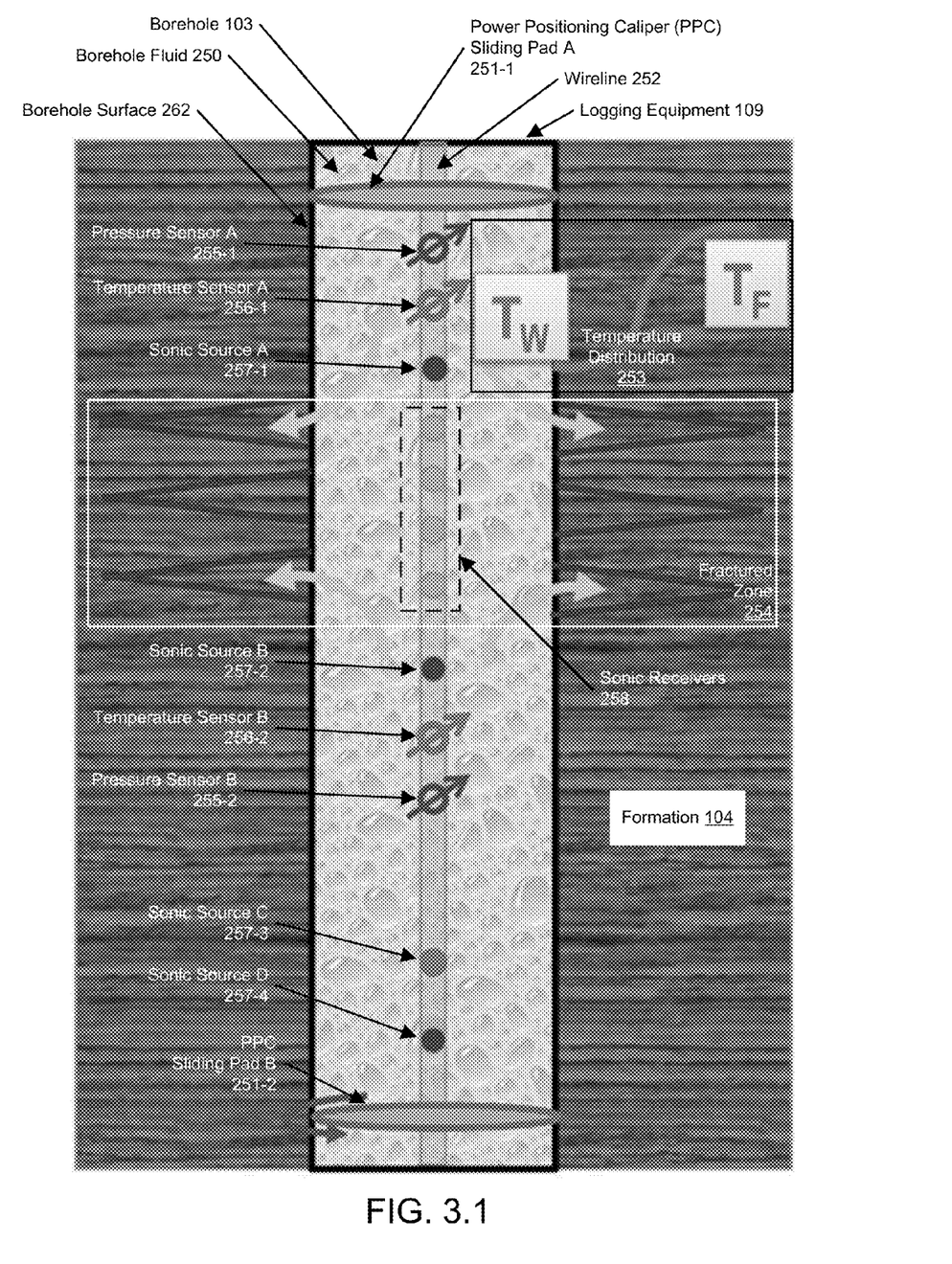

FIG. 3.1 shows an example of the logging equipment (109) depicted in FIGS. 1.1 and 1.2. As shown in FIG. 3.1, the logging equipment (109) is suspended by the wireline (252) in the borehole (103), which may be an open or cased hole penetrating the formation (106) and filled with borehole fluid (250). Further, the borehole (103) is shown to include a fractured zone (254) where the borehole fluid (250) enters the formation (106). Due to a difference between the borehole fluid temperature ($T_w$) and the far-field formation temperature ($T_F$), the temperature distribution (253) is established radially starting from where the borehole (103) surface into the formation (106) away from the borehole (103). In one or more embodiments, the temperature distribution (253) is through the fractured zone (253) extending radially from the borehole (103) surface into the formation (106). In one or more embodiments, the borehole fluid temperature ($T_w$) is controlled by a borehole fluid controller (202-1) (e.g., a circulating drilling mud pump, a hydraulic fracturing fluid injector, or other type of borehole fluid temperature controller) associated with the surface unit (202) shown in FIG. 1.1 while the formation temperature ($T_F$) may be determined based on naturally occurring geothermal gradients found in the formation (106) or steam injection temperature of an adjacent injection well (104) shown in FIG. 1.1. For example, geothermal gradient may be caused by the rate of increasing temperature with respect to increasing depth in the Earth's interior.

As the logging equipment (109) traverses various depths in the borehole (103), temperature distributions (e.g., temperature distribution (253)) radially outside the open or cased borehole (103) and resultant thermoelastic properties may be different in different depth intervals. For example, the thermoelastic properties are different in depth intervals with open fractures (e.g., fractured zone (254)) supporting fluid flow into the formation (106) than the thermoelastic properties in depth intervals without any fractures supporting any fluid flow into the formation (106). In one or more embodiments, the logging equipment (109) may traverse any portion of the borehole (103) to measure frequency dependent characteristics of the borehole wave travelling in the borehole fluid (250) and along the borehole surface (262) of the borehole (103). Accordingly, the measurement results are compiled and provided to the borehole wave dispersion analyzer (205) as the borehole wave dispersion measurement (212).

Further as shown in FIG. 3.1, the logging equipment (109) includes pressure sensor A (255-1), pressure sensor B (255-2), temperature sensor A (256-1), and temperature sensor B (256-2), which are collectively referred to as sensors (217) in FIGS. 1.1 and 1.2. Further, the logging equipment (109) includes sonic sources and sonic receivers together forming the sonic tool (216) depicted in FIGS. 1.1 and 1.2. The sonic sources may include monopole sources (e.g., sonic source A (257-1), sonic source B (257-2), and sonic source D (257-4)) and cross-dipole sources (e.g., sonic source C (257-3). The sonic receivers may include a sonic receiver array (e.g., formed by the sonic receivers (258)) and additional sonic receivers (not shown) disposed on the power positioning caliper (PPC) sliding pad A (251-1) and PPC sliding pad B (251-2). In one or more embodiments, the PPC sliding pad is configured to center the downhole equipments (e.g., BHA). For example, the sonic receivers (258) may be hydrophones submerged in the borehole fluid (250) while the additional receivers on the PPC sliding pads may be geophones in contact with the borehole surface (262). In one or more embodiments, the sonic source bandwidth ranges from a 0.5 to 20 kHz, the sonic receivers (258) includes 27 axial stations that are spaced 2-3 inches from each other, the pressure sensor A (255-1) and temperature sensor A (256-1) are disposed approximately 8-12 inches above the sonic receivers (258), and the pressure sensor B (255-2) and temperature sensor B (256-2) are disposed approximately 8-12 inches below the sonic receivers (258).

An acoustic source in the fluid-filled borehole (103) generates headwaves as well as borehole-guided modes. A monopole source (e.g., sonic source A (257-1), sonic source B (257-2), and sonic source D (257-4)) generates primarily the lowest-order axisymmetric mode, also referred to as the Stoneley mode, together with compressional and shear headwaves. In contrast, a dipole source (e.g., sonic source C (257-3) primarily excites the lowest-order flexural borehole mode together with compressional and shear headwaves. The headwaves are caused by the coupling of the transmitted acoustic energy to plane waves in the formation (106) that propagate along the borehole axis. An incident compressional wave in the borehole fluid (250) produces critically refracted compressional waves in the formation (106). Those refracted along the borehole surface (262) are known as compressional headwaves. The critical incidence angle $\theta i = \sin^{-1}(Vf/Vc)$, where Vf is the compressional wave speed in the borehole fluid (250); and Vc is the compressional wave speed in the formation (106). As the compressional headwave travels along the interface (i.e., borehole surface (262)), it radiates energy back into the borehole fluid (250) that can be detected by hydrophone receivers (e.g., sonic receivers (258)) placed in the fluid-filled borehole (103). In fast formations, the shear headwave can be similarly excited by a compressional wave at the critical incidence angle $\theta i = \sin^{-1}(Vf/Vs)$, where Vs is the shear wave speed in the formation (106). A fast formation is characterized by its shear velocity larger than the borehole fluid compressional velocity, whereas a slow formation has its shear velocity smaller than the borehole fluid compressional velocity. In slow formations, formation shear velocities are obtained from the low-frequency asymptote of flexural dispersion. In one or more embodiments, the recorded monopole and dipole waveforms are included in the borehole wave dispersion measurement (212). Accordingly, formation shear velocities can be determined in either fast or slow formations from these recorded monopole and dipole waveforms.

Figure 32:
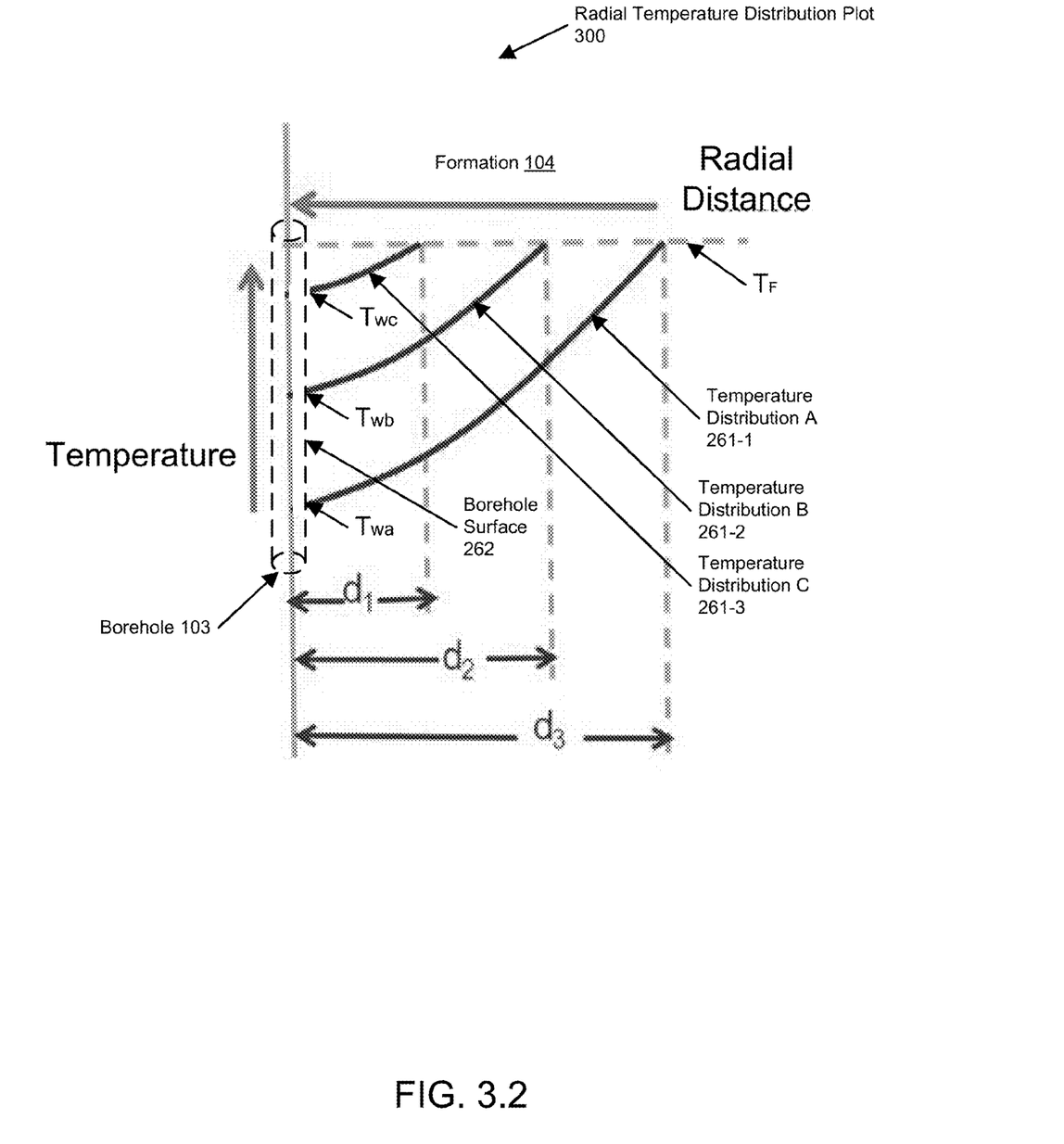

FIG. 3.2 shows a radial temperature distribution plot (300) of example temperature distributions in the formation (106) away from the borehole surface (262). The radial temperature distribution plot (300) is shown as superimposing over a schematic view of the borehole (103) in the formation (106) where the vertical axis of the radial temperature distribution plot (300) aligns with an imaginary center axis of the borehole (103) and represents temperature in the formation (106). The horizontal axis of the radial temperature distribution plot (300) represents radial distance away from the center of the borehole (103). In particular, the temperature distribution A (261-1), temperature distribution B (261-2), and temperature distribution C (261-1) represent typical temperature distributions (e.g., temperature distribution (253) shown in FIG. 3.1) outside the fluid-filled borehole (103) at different time intervals. In one or more embodiments, these temperature distributions of the radial temperature distribution plot (300) may be obtained by solving a heat conduction equation based on thermal properties of the formation (106).

At a particular time point since the borehole fluid was initially introduced into the formation (106), the temperature distribution A (261-1) shows that the borehole fluid temperature $T_{wa}$ is lower than the far-field formation temperature $T_F$ with radially varying temperature extending to a distance of $d_3$ from the borehole surface (262). In an example scenario where the borehole fluid is not circulating during a wireline logging operation, the lower temperature of the borehole fluid will eventually increase and reach an equilibration with the temperature of the surrounding formation. As time elapses, the temperature distribution B (261-2) shows that the borehole fluid temperature $T_{wb}$ increases towards the far-field formation temperature $T_F$ and the radial extent of temperature variation decreases to $d_2$. As time further elapses, the temperature distribution C (261-3) shows that the borehole fluid temperature $T_W$, further increases towards the far-field formation temperature $T_F$ and the radial extent of temperature variation further decreases to $d_1$.

Although the borehole fluid has lower temperature than the far-field formation temperature $T_F$ in the example shown in FIG. 3.2, in other examples, the borehole fluid may have a higher temperature than the far-field formation temperature $T_F$. Further, the borehole fluid may be circulating and maintains a temperature difference with respect to the surrounding formation. In these other examples, the temperature distributions in the formation (106) away from the borehole surface (262) at different time intervals may differ from the radial temperature distribution plot (300) shown in FIG. 3.2.

As noted above, temperature gradients between the borehole fluid and the formation can cause thermal stresses to influence the interpretation of borehole sonic waves. To develop a thermoelastic model to model the influence of these thermal gradients on sonic waves, thermal properties, such as the thermal conductivity, specific heat and thermal expansion coefficients of porous rocks, shales, limestones, sandstones, granite, and coal seams in the formation are measured. Mechanical and thermal strains in the sonic wave propagating medium are summed together to form a total strain. Mechanical strains are introduced by the application of external stresses. In contrast, thermal strains are caused by thermal expansions and may exist in the absence of any externally applied stresses.

TABLE 1 shows stress and strain equations where $\epsilon_{ij}$ is the total strain tensor in the propagating medium, the superscript S and T denote the static and thermal strains; $\alpha$ is the coefficient of thermal expansion; $\delta_{ij}$ is the Kronecker delta; T and $T_0$ are the current and reference temperatures, respectively; $\lambda$ and $\mu$ are the two Lame constants of the isotropic propagating medium.

TABLE 1

Total strain:
$\epsilon_{ij} = \epsilon_{ij}^S + \epsilon_{ij}^T$,
Thermal strain:
$\epsilon_{ij}^T = \alpha(T - T_0)\delta_{ij}$,
Total strain:

$$\varepsilon_{ij} = \frac{1}{2\mu}\left(\sigma_{ij} - \frac{\lambda}{3\lambda + 2\mu}\delta_{ij}\sigma_{kk}\right) + \alpha(T - T_0)\delta_{ij},$$

Total stress:
$\sigma_{ij} = \lambda \delta_{ij} \epsilon_{kk} + 2\mu \epsilon_{ij} - (3\lambda + 2\mu)\alpha \delta_{ij}(T - T_0)$.

TABLE 2 shows radial displacement of the formation, thermal strains, and thermal stresses as a function of temperature distribution T(ρ) outside the borehole. In the equations shown in TABLE 2, $u_r(r)$ is the radial displacement at radial position r from the borehole axis; a denotes the borehole radius; b represents the radial position where the formation steady-state temperature (i.e., far-field formation temperature) is attained; T(ρ) is the temperature distribution as a function of radial position ρ; $\epsilon_{rr}$ and $\epsilon_{\phi\phi}$ are the radial and circumferential components of thermal strains in the propagating medium induced by the temperature distribution T(ρ); thermal stresses $\sigma_{rr}$, $\sigma_{\phi\phi}$, and $\sigma_{zz}$ represent the radial, hoop, and axial stresses, respectively, generated by temperature distribution T(ρ). In particular, T(ρ) is the temperature distribution as a function of radial position ρ from the borehole surface at ρ=a, to the far-field denoted by ρ=b where the far-field formation temperature is attained. Examples of T(ρ) are shown in FIG. 3.2 above. Further, the tensile hoop stress $\sigma_{\phi\phi}$ may reach a level to cause fractures at the borehole surface.

TABLE 2

Radial displacement (caused by temperature distribution away from the borehole surface):

$$u_r(r) = m\left[\frac{1}{r}\int_a^r T(\rho)\rho\,d\rho + \frac{1}{b^2 - a^2}\left(\frac{a^2}{r} + \frac{\mu r}{\lambda + \mu}\right)\int_a^b T(\rho)\rho\,d\rho\right],$$

where $$m = \frac{(3\lambda + 2\mu)\alpha}{\gamma + 2\mu},$$

Thermal strains (calculated based on the radial displacement):

$$\varepsilon_{rr} = u_{r,r}$$
$$= m\left[T(r) - \frac{1}{r^2}\int_a^r T(\rho)\rho\,d\rho + \frac{1}{b^2 - a^2}\left(\frac{\mu}{\lambda + \mu} - \frac{a^2}{r^2}\right)\int_a^b T(\rho)\rho\,d\rho\right],$$

$$\varepsilon_{\phi\phi} = \frac{u_r}{r},$$

thermal stresses:

$$\sigma_{rr} = -2\mu m\left[\frac{1}{r^2}\int_a^r T(\rho)\rho\,d\rho - \frac{1}{b^2 - a^2}\left(1 - \frac{a^2}{r^2}\right)\int_a^b T(\rho)\rho\,d\rho\right],$$

$$\sigma_{\phi\phi} = -2\mu m\left[T(r) - \frac{1}{r^2}\int_a^r T(\rho)\rho\,d\rho - \frac{1}{b^2 - a^2}\left(1 + \frac{a^2}{r^2}\right)\int_a^b T(\rho)\rho\,d\rho\right],$$

$$\sigma_{zz} = -2\mu m\left[T(r) - \frac{\lambda}{(b^2 - a^2)(\lambda + \mu)}\int_a^b T(\rho)\rho\,d\rho\right].$$

As noted above, borehole wave dispersion measurement (e.g., shown in FIG. 1.2) may be obtained in the presence of temperature distributions (e.g., shown in FIG. 3.2) between the borehole surface and the far-field radial depth of investigation of the Stoneley or dipole flexural mode. Further, the reference borehole dispersion can be computed based on far-field formation properties and an assumption that the far-field formation temperature is uniform away from the borehole surface, implying that near-wellbore thermal stresses are not present. For example, the reference borehole dispersion may be computed using the equations in TABLE 2 above. Accordingly, differences between the measured and reference borehole dispersions are modeled in terms of thermal conductivity, specific heat, and thermal expansion coefficient of the formation. TABLE 3 shows a volume integral equation describing fractional changes in the phase velocity of the borehole axisymmetric mode (i.e., Stoneley mode), flexural modes, or higher-order quadrupole modes. The fractional changes in the phase velocity correspond to the aforementioned difference between the reference dispersion and the borehole wave dispersion measurement. In one or more embodiments, modeling the differences between the measured and reference borehole dispersions includes using inversion algorithms to estimate the formation thermal properties depending on the sensitivity of the measured dispersion to any such thermal properties.

TABLE 3

$$\frac{\Delta V_{ki}}{V_{ki}^m} = \frac{\Delta \omega_{ki}}{\omega_{ki}^m}$$

$$= \frac{\int_V \Delta C_{ijkl} u_{i,j}^m u_{k,l}^m \, dV}{2(\omega_{ki}^m)^2 \int_V \rho_0 u_q^m u_q^m \, dV} - \frac{\int_V \Delta \rho u_i^m u_i^m \, dV}{2\int_V \rho_0 u_q^m u_q^m \, dV},$$

$$\Delta \rho = -w_{\alpha,\alpha}\rho_0,$$
$$\Delta C_{ijkl} = \tau_{il}^1 \delta_{jk} + (P_W - P_P)(\delta_{ij}\delta_{kl} - \delta_{il}\delta_{jk}) + C_{ijklmn}E_{mn}^1 + C_{pjkl}w_{i,p} + C_{ipkl}w_{j,p} + C_{ijpl}w_{k,p} + C_{ijkp}w_{l,p}.$$

In the equations shown in TABLE 3, the Cartesian tensor notation and convention are used where a comma followed by an index j denotes differentiation with respect to the coordinate $x_j$, and the summation convention for repeated indices is also implied. Further, $V_{ki}$ and $\omega_{ki}$ are the phase velocity and harmonic frequency for a given axial wave-number ki, $\Delta C_{ijkl}$ and $\Delta\rho$ denote changes in the effective second-order elastic stiffness and mass density of the propagating medium, respectively, caused by changes in the temperature T from a reference temperature $T_0$ (e.g., the far-field formation temperature $T_F$ shown in FIG. 3.1), the particle displacement $u_i$ and displacement gradients $u_{i,j}$ associated with the propagation of a borehole mode are the eigen-solution obtained from a boundary value problem of a fluid-filled borehole in the presence of a sonic tool structure. The mass density in the reference state (i.e., the steady state in the far-field of the formation) is denoted by $\rho_0$, whereas $w_{k,p}$ represents quasi-static displacement gradient caused by temperature distributions in the formation surrounding a fluid-filled borehole. The second-order and third-order elastic constants of the formation in the reference state characterized by temperature $T_0$ are denoted by $C_{ijkl}$ and $C_{ijklmn}$, respectively; and $\delta_{ij}$ is the Kronecker delta. The wellbore and formation pressures are denoted by $P_w$ and $P_F$, respectively. The thermal stresses and strains in the propagating medium are represented by $\tau_{ij}^1$ and $E_{mn}^1$ respectively.

The volume integral equation shown in TABLE 3 can be reduced to the form shown in TABLE 4. The volume integral equation can be used to model the aforementioned difference between the reference dispersion and the borehole wave dispersion measurement. In other words, the thermoelastic parameter m can be determined by interpreting the aforementioned difference between the reference dispersion and the borehole wave dispersion measurement based on this volume integral equation.

TABLE 4

$$\frac{\Delta V_i}{V_i} = m\int_a^d A_i(r)r\,dr,$$

$$m = \frac{(3\lambda + 2\mu)\alpha}{\lambda + 2\mu},$$

where $\Delta V_i/V_i$, denotes fractional differences between the measured and reference dispersions at wavenumber $k_i$; m denotes a thermoelastic parameter of the formation; $A_i(r)$ denotes the data kernel at wavenumber $k_i$; and $\lambda$ and $\mu$ are the average Lame parameters of the formation. Lower 'a' and upper 'd' integration limits correspond to the borehole radius and the formation far-field associated with temperatures $T_W$ and $T_F (=T_0)$, respectively. In particular, the data kernel $A_i(r)$ is obtained from the eigen-solution for the borehole Stoneley in the chosen reference state. Specifically, the chosen state is defined by the far-field elastic properties of a particular formation layer at a steady-state temperature $T_F=T_0$. In addition, the data kernel $A_i(r)$ in the equation above may be replaced by a different data kernel $B_i(r)$ that is obtained from the eigen-solution for the dipole flexural modes in the chosen reference state.

In one or more embodiments, the equations shown in TABLE 1 through TABLE 4 are included as part of the aforementioned thermoelastic model. For example, these equations may be used to invert the Stoneley dispersion and/or dipole flexural dispersion to generate the far-field shear moduli for computing the reference dispersion therefrom. Further, these equations may be used to model the difference between the measured Stoneley dispersion (i.e., from aforementioned borehole wave dispersion measurement) and the reference dispersion. Accordingly, the thermoelastic parameter (e.g., m) is calculated using the thermoelastic model. For example, a borehole log of m versus depth may be viewed or otherwise analyzed by a user to identify a condition of a fracture (natural or hydraulically induced), so as to adjust a fracture operation or production plan. For example, depending on the status of the fracture the user may decide to increase the hydraulic fracturing pressure to enhance the production or decide to terminate the production plan altogether. Hydraulic fractures serve as conduits for the hydrocarbons from a reservoir to flow into the production wells. So larger fracture width and length help to enhance hydrocarbon productivity. For example, the status of the fracture may indicate larger differences than about 20% in the estimate of thermoelastic parameter m in the fractured interval from that in unfractured zone, together with estimates of the distance d larger than about two times of borehole diameter from the borehole surface. This fracture status is an indicator of successful fracturing operation and the user may terminate the fracturing process as being completed. Further, the extent (i.e., d) of temperature distribution may also be calculated by solving the volume integral equation shown in TABLE 4. The calculated extent (i.e., d) of temperature distribution may allow the user to determine where the steam injection front, from an injection well, is located relative to the production well. Accordingly, the user may adjust (e.g., increase) the injection pressure, temperature, or flow rate of the steam injection to enhance heavy oil production at the production well. Alternatively, the user may determine that the injection well is ineffective because the steam has been diverted through another subterranean path. Accordingly, the user may decide to shut down the ineffective injection well.

Further, any changes in the rock thermal diffusivity and thermoelastic constant as a function of formation lithology would change the thermoelastic response of elastic waves propagating along a fluid-filled borehole. Thermoelastic response of borehole waves can be expressed in terms of fractional changes in the phase velocity of a borehole Stoneley or flexural mode at a given wave-number that is calculated in terms of the quasi-static temperature distribution, incremental thermal stresses and strains from a chosen reference state. Insofar as the thermal conductivity, specific heat, and thermoelastic coefficients of a fluid-filled fractured rock are different than the unfractured rock, thermoelastic response of borehole elastic waves provide indicators of depth intervals containing such fluid-filled fractures. The presence of such fluid-filled fractures can also cause fluid-flow from the borehole into a surrounding fractured formation when the wellbore pressure is larger than the reservoir pore pressure. Any such fluid flow also introduces quasi-static biasing stresses and strains in the propagating medium and results in characteristic changes in the measured Stoneley and flexural dispersions. These characteristic changes in the borehole dispersions provide indicators of depth intervals containing natural open fractures contributing to the fluid flow either from the wellbore to the reservoir or from the reservoir to the wellbore depending on the relative values of the wellbore and reservoir pressures.

Figure 33:
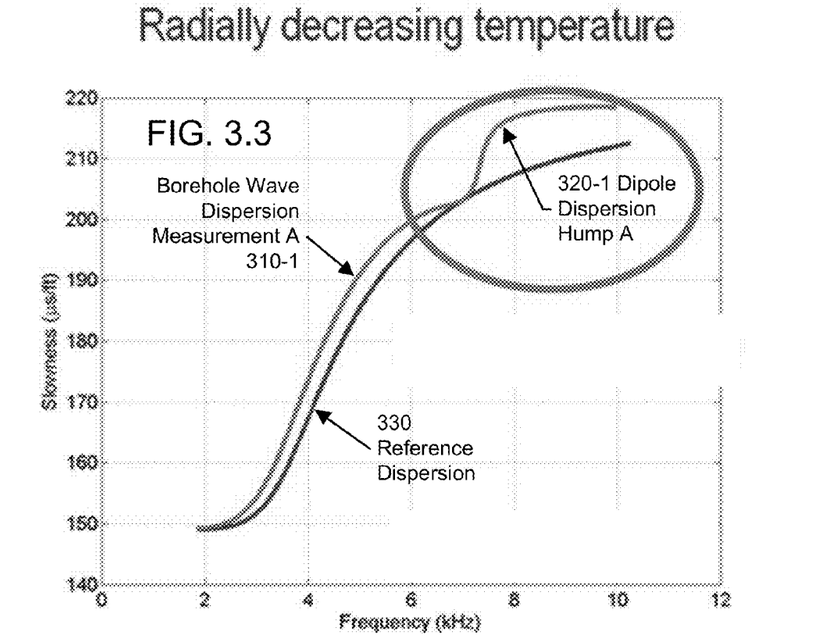
Figure 34:
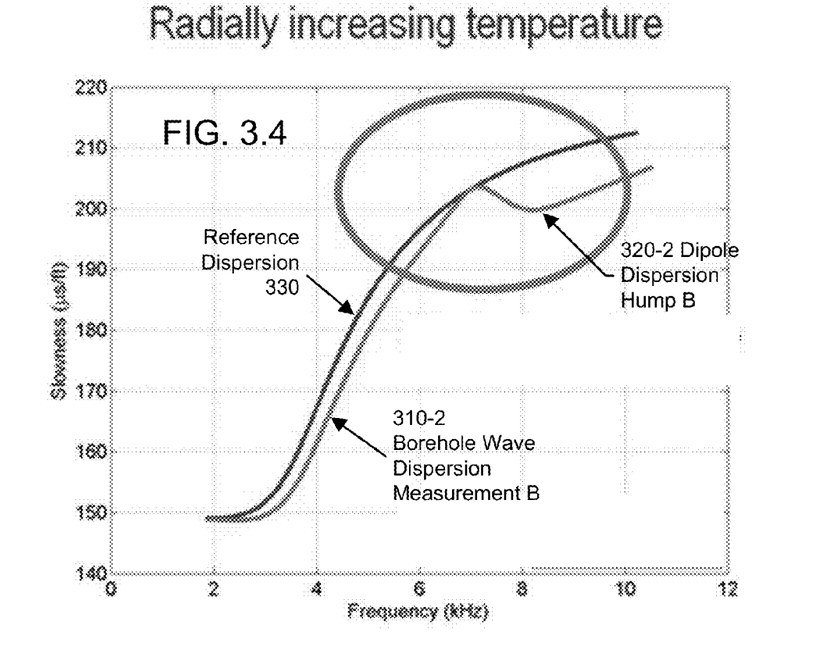

FIGS. 3.3 and 3.4 show an example of the difference between borehole wave dispersion measurement and the reference dispersion in accordance with one or more embodiments. FIG. 3.3 shows an example dipole flexural dispersion hump A (320-1) in the borehole wave dispersion measurement A (310-1) compared to the reference dispersion (330). As noted above, the difference between the borehole wave dispersion measurement A (310-1) and the reference dispersion (330), in particular the dipole flexural dispersion hump A (320-1), is induced by the presence of radially decreasing temperature and associated thermal stresses in the near-wellbore region at a particular depth interval where the borehole wave dispersion measurement A (310-1) is obtained. Accordingly, a feature (e.g., a fracture containing fluid) of the formation may be detected at this particular depth interval based on the dipole flexural dispersion hump A (320-1).

In contrast, FIG. 3.4 shows another example dipole flexural dispersion hump B (320-2) in the borehole wave dispersion measurement B (310-2) compared to the reference dispersion (330). Similar to the above, the difference between the borehole wave dispersion measurement B (310-2) and the reference dispersion (330), in particular the dipole flexural dispersion hump B (320-2), is induced by the presence of radially increasing temperature and associated thermal stresses in the near-wellbore region where the borehole wave dispersion measurement B (310-2) is obtained. Accordingly, a feature (e.g., a fracture containing fluid) of the formation may be detected at this particular depth interval based on the dipole flexural dispersion hump B (320-2).

By detecting the formation feature based on the dipole flexural dispersion hump A (320-1) or the dipole flexural dispersion hump B (320-2) shown in FIGS. 3.3 and 3.4, a field operation may be performed accordingly. For example, the fluid containing fracture may be a natural fracture where hydrocarbon extraction may be advantageously performed. In another example, the fluid containing fracture may indicate a status of the EOR operation, based on which operating parameters of the EOR operation may be adjusted.

Figure 4:
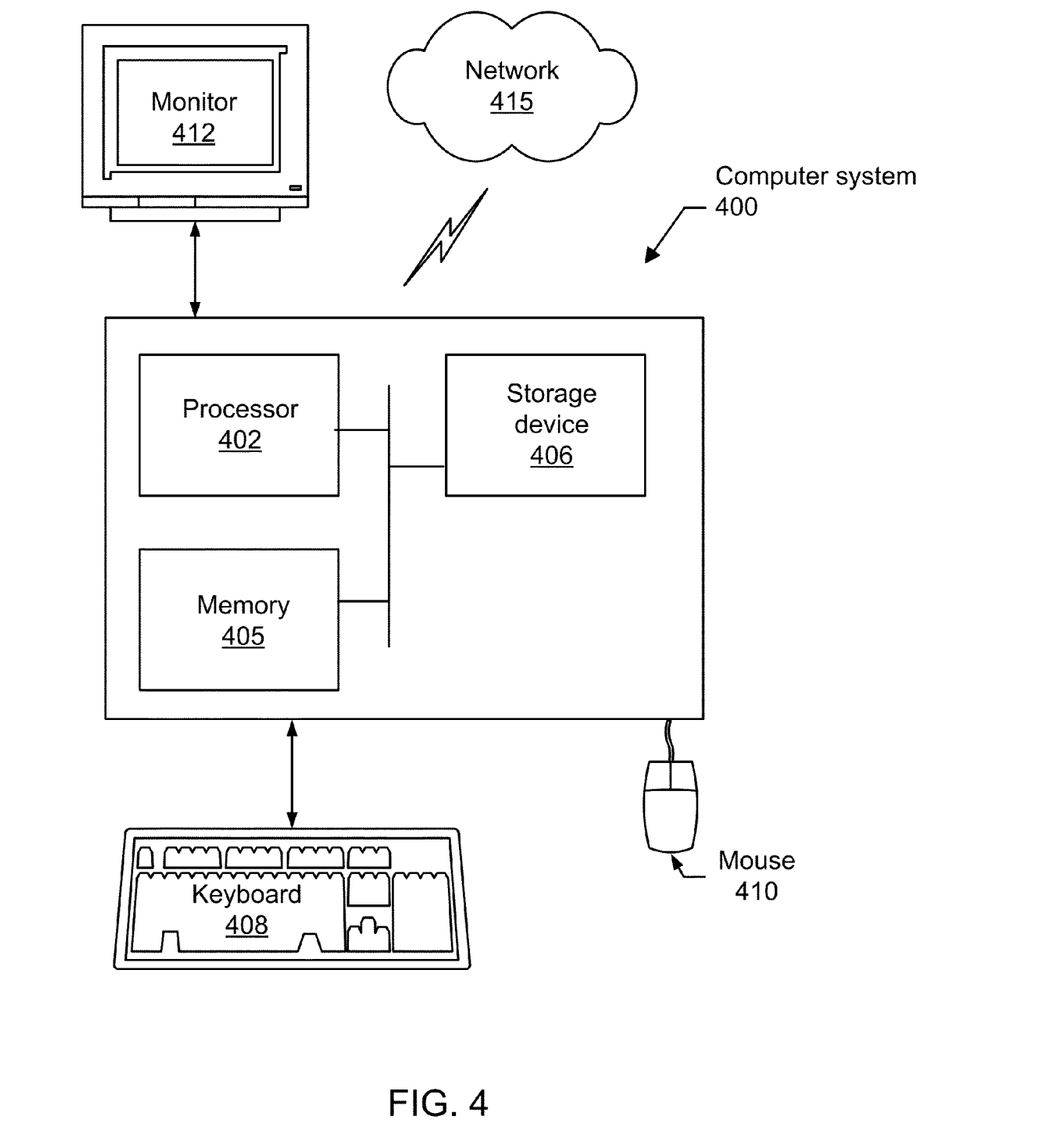
FIG. 4 shows a computer system using which one or more embodiments of thermoelastic logging may be implemented.

Embodiments of thermoelastic logging may be implemented on virtually any type of computer regardless of the platform being used. For instance, as shown in FIG. 4, a computer system (400) includes one or more processor(s) (402) such as a central processing unit (CPU) or other hardware processor, associated memory (405) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown).

Further, the computer (400) may include output means, such as a monitor (412) (e.g., a liquid crystal display LCD, a plasma display, or cathode ray tube (CRT) monitor). The computer system (400) may be connected to a network (415) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape or any other computer readable storage device.

While thermoelastic logging has been described with respect to a limited number of embodiments, those skilled in the art, having benefit of this disclosure, will appreciate that other embodiments may be devised which do not depart from the scope of thermoelastic logging as disclosed herein. Accordingly, the scope of thermoelastic logging should be limited only by the attached claims.

What is claimed is:

1. A method for thermoelastic logging in a borehole of a subterranean formation, comprising:
generating, by a computer processor, a reference dispersion based on a borehole wave dispersion measurement of the borehole, wherein the reference dispersion represents far-field elastic properties in the subterranean formation;
analyzing, by the computer processor, a difference between the reference dispersion and the borehole wave dispersion measurement based on a thermoelastic model of the subterranean formation to generate an analysis result; and
determining, by the computer processor and based on the analysis result, a temperature dependent parameter of the subterranean formation.

2. The method of claim 1, further comprising:
displaying the temperature dependent parameter of the subterranean formation.

3. The method of claim 1, further comprising:
performing a field operation based at least on the temperature dependent parameter of the subterranean formation.

4. The method of claim 1,
wherein the temperature dependent parameter comprises a thermoelastic parameter of the subterranean formation.

5. The method of claim 1, further comprising:
determining, based on the temperature dependent parameter, a temperature of the subterranean formation as a function of a radial distance from the borehole.

6. The method of claim 1, further comprising:
generating, by varying a depth of a bottom hole assembly (BHA) in the borehole, a borehole log comprising the temperature dependent parameter as a function of a depth in the borehole, wherein the borehole wave dispersion measurement is obtained from the BHA; and
detecting a feature of the subterranean formation based on the borehole log.

7. The method of claim 6, further comprising:
introducing borehole fluid into the borehole from a wellsite,
wherein the feature of the subterranean formation comprises a fracture containing the borehole fluid entered therein from the borehole,
wherein the borehole fluid and the subterranean formation have different temperatures to cause radially varying amounts of thermal stresses that affect propagation characteristics of elastic waves along an axis of the borehole, and
wherein the thermoelastic model models the thermal stresses, the propagation characteristics of the elastic waves, and the temperature dependent parameter of the subterranean formation.

8. The method of claim 1, further comprising:
performing a steam injection operation using an injection well adjacent to the borehole;
identifying, based on the temperature dependent parameter, a location of a steam injection front of the steam injection operation; and
adjusting the steam injection operation based on the location of the steam injection front,
wherein the steam injection operation causes radially varying amounts of thermal stresses that affect propagation characteristics of elastic waves along an axis of the borehole, and
wherein the thermoelastic model models the thermal stresses, the propagation characteristics of the elastic waves, and the temperature dependent parameter of the subterranean formation.

9. A system for thermoelastic logging in a borehole of a subterranean formation, comprising:
a sonic tool in the borehole to obtain a borehole wave dispersion measurement of the borehole;
a processor and memory storing instructions, when executed by the processor comprising functionalities to:
generate a reference dispersion based on the borehole wave dispersion measurement, wherein the reference dispersion represents far-field elastic properties in the subterranean formation;
analyze a difference between the reference dispersion and the borehole wave dispersion measurement based on a thermoelastic model of the subterranean formation to generate an analysis result; and
determine, based on the analysis result, a temperature dependent parameter of the subterranean formation; and
a repository storing the borehole wave dispersion measurement.

10. The system of claim 9, further comprising:
a display device configured to display the temperature dependent parameter of the subterranean formation.

11. The system of claim 9, further comprising:
an apparatus configured to perform a field operation based at least on the temperature dependent parameter of the subterranean formation.

12. The system of claim 9,
wherein the temperature dependent parameter comprises a thermoelastic parameter of the subterranean formation.

13. The system of claim 9, the instructions, when executed by the processor further comprising functionalities to:
determine, based on the temperature dependent parameter, a temperature of the subterranean formation as a function of a radial distance from the borehole.

14. The system of claim 9, the instructions, when executed by the processor further comprising functionalities to:
generate, by varying a depth of a bottom hole assembly (BHA) in the borehole, a borehole log comprising the temperature dependent parameter as a function of a depth in the borehole, wherein the borehole wave dispersion measurement is obtained from the BHA; and
detect a feature of the subterranean formation based on the borehole log.

15. The system of claim 14, further comprising:
a temperature sensor adjacent to the sonic tool and configured to measure a borehole fluid temperature of borehole fluid introduced into the borehole,
wherein the feature of the subterranean formation comprises a fracture containing the borehole fluid entered therein from the borehole,
wherein the borehole fluid temperature is different from a formation temperature of the subterranean formation to cause radially varying amounts of thermal stresses that affect propagation characteristics of elastic waves along an axis of the borehole, and
wherein the thermoelastic model models the borehole fluid temperature, the formation temperature, the thermal stresses, the propagation characteristics of the elastic waves, and the temperature dependent parameter of the subterranean formation.

16. The system of claim 14, the instructions, when executed by the processor further comprising functionalities to:
identify, based on the temperature dependent parameter, a location of a steam injection front from an injection well adjacent to the borehole; and
adjust a steam injection operation of the injection well based on the location of the steam injection front,
wherein the steam injection operation causes radially varying amounts of thermal stresses that affect propagation characteristics of elastic waves along an axis of the borehole, and
wherein the thermoelastic model models the thermal stresses, the propagation characteristics of the elastic waves, and the temperature dependent parameter of the subterranean formation.

17. A non-transitory computer readable medium storing instructions for thermoelastic logging in a borehole of a subterranean formation, the instructions when executed causing a computer processor to:
generate a reference dispersion based on a borehole wave dispersion measurement of the borehole, wherein the reference dispersion represents far-field elastic properties in the subterranean formation;
analyze a difference between the reference dispersion and the borehole wave dispersion measurement based on a thermoelastic model of the subterranean formation to generate an analysis result; and
determine, based on the analysis result, a temperature dependent parameter of the subterranean formation.

18. The non-transitory computer readable medium of claim 17, the instructions when executed further causing the computer processor to:
determine, based on the temperature dependent parameter, a temperature of the subterranean formation as a function of a radial distance from the borehole.

19. The non-transitory computer readable medium of claim 17, the instructions when executed further causing the computer processor to:
generate, by varying a depth of a bottom hole assembly (BHA) in the borehole, a borehole log comprising the temperature dependent parameter as a function of a depth in the borehole, wherein the borehole wave dispersion measurement is obtained from the BHA; and
detect a feature of the subterranean formation based on the borehole log.

20. The non-transitory computer readable medium of claim 17, the instructions when executed further causing the computer processor to:
identify, based on the temperature dependent parameter, a location of a steam injection front from an injection well adjacent to the borehole; and
adjust a steam injection operation of the injection well based on the location of the steam injection front,
wherein the steam injection operation causes radially varying amounts of thermal stresses that affect propagation characteristics of elastic waves along an axis of the borehole, and
wherein the thermoelastic model models the thermal stresses, the propagation characteristics of the elastic waves, and the temperature dependent parameter of the subterranean formation.

* * * * *